(12) United States Patent
Yamashita et al.

(10) Patent No.: US 6,327,295 B1
(45) Date of Patent: Dec. 4, 2001

(54) GAS LASER OSCILLATOR

(75) Inventors: Takayuki Yamashita; Hiroyuki Hayashikawa, both of Toyonaka; Satoshi Eguchi, Takatsuki, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/691,251

(22) Filed: Oct. 19, 2000

Related U.S. Application Data

(62) Division of application No. 09/123,357, filed on Jul. 28, 1998.

(30) Foreign Application Priority Data

Jul. 28, 1997 (JP) .................................................. 9-201589
Jul. 28, 1997 (JP) .................................................. 9-201592

(51) Int. Cl.[7] ........................................................ H01S 3/00
(52) U.S. Cl. ............................................. 372/109; 372/33
(58) Field of Search ............................... 372/109, 33, 55

(56) References Cited

U.S. PATENT DOCUMENTS

| 5,708,745 | * | 1/1998 | Yamaji et al. | 372/33 |
| 5,991,319 | * | 11/1999 | Zamel et al. | 372/38 |
| 6,091,749 | * | 7/2000 | Hoffmaster et al. | 372/38 |

* cited by examiner

Primary Examiner—James W. Davie
(74) Attorney, Agent, or Firm—Wenderoth, Lind & Ponack, L.L.P.

(57) ABSTRACT

The gas laser oscillator of the invention comprises a discharge tube, a pair of electrodes disposed at both ends thereof, a direct-current high voltage power source for applying a direct-current high voltage in pulse form to the pair of electrodes, an output control device for controlling the direct-current high voltage power source, a fully reflective mirror provided at one end of the outside of the pair of electrodes, a partially reflective mirror disposed at other end of the outside of the pair of electrodes, and an absorber disposed outside of the partially reflective mirror. In thus constituted gag laser oscillator, the output control device controls to apply a same direct-current voltage as during processing between the pair of electrodes also on standby while the absorber is closed.

The gas laser oscillator of the invention further comprises a beam splitter outside of the absorber, a switch to be actuated while the beam splitter is installed at a specified position, a focusing lens disposed on the optical axis of the laser beam reflected and separated by the beam splitter, a shielding plate disposed so as to open or close the passage of laser beam, a switch to be actuated while the shielding plate is open, a detector for detecting the laser beam, an amplifier for amplifying the output of the detector, and a medium passage disposed in contact with the detector for realizing heat exchange between the temperature-controlled medium and the detector, whereby it is controlled to issue the laser beam only while the beam splitter is installed at a specified position. The output of the laser beam is controlled so that the detector input may not exceed the maximum allowable input of the detector while the shielding plate is open. Moreover, the beam splitter, focusing lens, and detector are arranged so that the optical axis may be horizontal to the laser beam passing therethrough.

5 Claims, 10 Drawing Sheets

GAS LASER OSCILLATOR

This application is a divisional application of application Ser. No. 09/123,357, filed Jul. 28, 1998.

BACKGROUND OF THE INVENTION

The present invention relates to a gas laser oscillator low in fluctuation rate of laser beam, capable of producing laser beam stably, and free from malfunction.

First, a conventional gas laser oscillator is described by referring to FIG. 11. In FIG. 11, reference numeral 1 is a discharge tube for forming a discharge space 5 inside, and the inside of the discharge tube 1 is filled with laser gas, or laser gas is circulating by a circulating device not shown in the drawing. Reference numeral 2 is an electrode provided at one end of the discharge tube 1, 3 is an electrode provided at other end of the discharge tube 1, 4 is a direct-current high voltage power source for applying a voltage for discharging between the electrodes 2 and 3, and 6 is a fully reflective mirror, which is combined with a partially reflective mirror 7 to compose an optical resonator for amplifying the laser light. Reference numeral 9 is an output control device for controlling the direct-current high voltage power source 4.

This is the basic constitution of the gas laser oscillator. In thus constituted gas laser oscillator, the operation of its basic portion is described below. First, according to the command from the output control device 9, a direct-current high voltage in pulse form is applied between the electrodes 2 and 3 from the direct-current high voltage power source 4 for discharging between the electrodes 2 and 3. By this discharge energy, the laser gas in the discharge space 5 is excited. The excited laser gas is set in resonant state by the optical resonator composed of the fully reflective mirror 6 and partially reflective mirror 7, and the light is amplified, and a laser beam 8 is issued from the partially reflective mirror 7. The produced laser beam 8 is used in laser processing such as cutting and piercing.

In such gas laser oscillator, also on standby while not processing, discharge occurs in the discharge tube 1, and the laser beam 8 is issued from the partially reflective mirror 7 at a preset output level. However, since an absorber 10 is disposed ahead of the partially reflective mirror 7, the produced laser beam 8 is intercepted by the absorber 10 and does not leak outside.

When processing by the laser beam 8, by the command from an absorber control device 12, an absorber drive device 11 operates the absorber 10, and the passage of laser beam 8 is opened, and the laser beam 8 is emitted outside to process the workpiece 15.

On the other hand, at the side closer to the workpiece 15 from the absorber 10 on the optical axis of the laser beam 8, a beam splitter 14 is disposed. The laser beam 8 is separated by this beam splitter 14, and the straightforward portion 8a reaches the workpiece 15, and processes by cutting or piercing. The portion 8b reflected and separated by the beam splitter 14 is focused by a focusing lens 16, and irradiates a detector 17. The detector 17 irradiated by the separated portion 8b detects that the laser beam 8 is being emitted. This detection signal is amplified by an amplifier 18, and is issued from a terminal 19.

However, the conventional gas laser oscillator as explained above had several problems.

First was a problem of fluctuation of laser beam output in a transient state from standby by cutting off the laser beam 8 by the absorber 10 to processing by passing the laser beam 8 by setting aside the absorber 10. That is, in the standby state (A) as shown in FIG. 7, a signal for obtaining an output of low level necessary for maintaining discharge is issued from the output control device 9, and a direct-current high voltage corresponding to the signal level is applied between the electrodes 2 and 3 to maintain discharge. Once a processing start signal is entered and the absorber 10 is opened to be in state (B), the processing start signal 13 is sent from the absorber control device 12 into the output control device 9. Receiving this signal 13, the output control device sends out a signal having level and waveform necessary for obtaining the output of pulse laser beam 8 suited to the purpose of processing. In the conventional control, however, since the discharge state in the discharge space 5 on standby is different from the discharge state in the discharge space 5 during processing, the dissociation state of laser gas is different between processing and standby. It hence takes time until the dissociation state of laser gas is stabilized from start of processing and fluctuations of laser output in the initial period of processing are large so that stable processing is disabled. Upon start of processing, further, it takes time to stabilize owing to the presence of unstable period due to heat effects of the fully reflective mirror 6 and partially reflective mirror 7 for composing the optical resonator and unstable period of surface state of the electrode 2 and electrode 3, which is also a cause of unstable output of the laser beam 8 in the initial period of processing. This unstable output of the laser beam 8 in the initial period of processing was a serious problem in processing for a short time, in particular.

Other problem is related to the laser beam detecting device that is indispensable for accurate control of the gas laser oscillator. In the conventional constitution shown in FIG. 11, after dismounting the beam splitter 14 for the purpose of adjustment of gas laser oscillator or the like, if laser processing is done without reassembling the beam splitter 14, the laser beam 8 not attenuated by the beam splitter 14 directly irradiates to the workpiece 15. As a result, the workpiece is irradiated with an exessive laser beam 8, and processing failure may occur.

Or, when adjusting the gas laser oscillator, if a laser beam 8 over the allowable capacity of the detector 17 is irradiated by mistake, the detector 17 may be broken.

Further, the detector 17 may fluctuate in the detecting sensitivity due to fluctuations of temperature depending on heat generation by incident of laser beam 8b or ambient temperature. Fluctuation of detecting sensitivity of the detector 17 may cause output of wrong information. For example, if the detecting sensitivity is raised, although laser beam 8 is not emitted, it may be falsely recognized that the laser beam 8 is emitted, or if the detecting sensitivity is lowered, although the laser beam is emitted, it may be falsely recognized that the laser beam 8 is not emitted. Hence, accurate control of the gas laser oscillator may be disabled.

Still more, if used for a long period, dust may deposit on the beam splitter 14, focusing lens 16, or detecting surface of the detector 17, and the detecting sensitivity may be lowered.

SUMMARY OF THE INVENTION

The invention is hence devised to solve the above plural problems, and it is a first object thereof to transfer promptly to a state of stable and favorable laser processing by eliminating the unstable period of laser beam output in the transient state of changing from standby to processing.

It is a second object to solve the problems relating to laser beam detector, including prevention of processing failure by irradiation of laser beam of excessive energy to the workpiece if forgetting to mount the beam splitter, prevention of damage of the detector due to excessive input to the detector by wrong adjustment, and prevention of wrong control of gas laser oscillator due to malfunction of detector caused by fluctuations of detector temperature or deposit of dust.

To achieve the objects, the gas laser oscillator of embodiment 1 of the invention comprises:

a discharge tube for forming a discharge space inside, a fully reflective mirror disposed toward the opening at one end of the discharge space for composing an end mirror, a partially reflective mirror disposed toward the opening at other end of the discharge space for composing an output mirror, a pair of electrodes disposed at both ends of the discharge tube, a direct-current high voltage power source for discharging in the discharge space by applying a high voltage of pulse form between the pair of electrodes, an output control device for Controlling the output of the direct-current high voltage power source, a movable absorber disposed outside of the partially reflective mirror for opening and closing the passage of laser beam, a drive device for driving to open or close the absorber, and an absorber control device for controlling the drive device so as to move the absorber to a position for intercepting the laser beam on standby, and to move to a position so that the absorber may not interfere passing of laser beam during processing, in which the output control device controls the direct-current high voltage power source so as to discharge in the same condition both upon standby and during processing.

The gas laser oscillator of embodiment 2 of the invention comprises:

a discharge tube for forming a discharge space inside, a fully reflective mirror disposed toward the opening at one end of the discharge space for composing an end mirror, a partially reflective mirror disposed toward the opening at other end of the discharge space for composing an output mirror, a pair of electrodes disposed at both ends of the discharge tube, a direct-current high voltage power source for discharging in the discharge space by applying a high voltage of pulse form between the pair of electrodes, an output control device for controlling the output of the direct-current high voltage power source, a beam splitter disposed outside of the partially reflective mirror so as to cut across the passage of laser beam for separating the laser beam, a switch which is actuated when the beam splitter is installed at a specified position, a focusing lens for focusing the laser beam separated by reflection by the beam splitter, a detector for detecting the laser beam focused by the focusing lens, an amplifier for amplifying the output of the detector and issuing a signal to the output control device, a shielding plate disposed between the focusing lens and detector for opening and closing, and a switch which is actuated when the shielding plate is opened.

In the gas laser oscillator of embodiment 2, preferably, the output control device controls the direct-current high voltage power source so that the laser beam may be emitted only while the switch which is actuated when the beam splitter is installed at a specified position is being actuated.

In the gas laser oscillator of embodiment 2, preferably, the output control device controls the direct-current high voltage power source so as not to emit a laser beam exceeding the maximum allowable input of the detector while the switch which is actuated when the shielding plate is opened is being actuated.

In the gas laser oscillator of embodiment 2, preferably, the detector is provided with a passage of medium so as to exchange heat with the medium, and the detector is controlled of temperature by the medium controlled of temperature.

In the gas laser oscillator of embodiment 2, preferably, the beam splitter, the focusing lens, and the detector are disposed so that the axis of laser beam passing therethrough may be in the horizontal direction.

According to the gas laser oscillator of embodiment 1, it is controlled so as to emit laser beam of same pulse width and same pulse frequency at same output level whether on standby or during processing, and the laser beam is prevented from escaping outside by the absorber, and therefore, on standby, the dissociation state of laser gas is same as during processing, and it does not take time to stabilize the dissociation state upon start of processing. Moreover, the temperature of partially reflective mirror and fully reflective mirror and surface state of the electrodes are same on standby and during processing, and transient unstable state does not occur upon start of processing, and the laser output is not unstable in the initial period of processing, so that favorable laser processing may be done.

According to the gas laser oscillator of embodiment 2, laser is not produced unless the beam splitter is installed at specified position, and therefore the workpiece is not irradiated with laser beam not attenuated by the beam splitter, and processing failure due to application of excessive input to the workpiece is avoided. Moreover, while the shielding plate is open, it is controlled so as not to emit the laser beam exceeding the maximum allowable input of the detector, and the detector is not broken by excessive input. Still more, since the detector is controlled of temperature by the medium controlled of temperature, the temperature of the detector is not changed by the input of laser beam or ambient temperature, and a stable detecting sensitivity is obtained. Moreover, since the beam splitter, focusing lens and detector are installed so that the optical axis of the laser beam passing through the beam splitter, focusing lens and detector may be horizontal, deposit of dust on the reflecting surface of the beam splitter, surface of the focusing lens, and detecting surface of the detector is lessened, reduction of the sensitivity of the detector in the time course are improved notably, and a stable detecting sensitivity is obtained for a long period.

DESCRIPTION OF THE PREFERRED EMBODIMENTS

Figure 1:
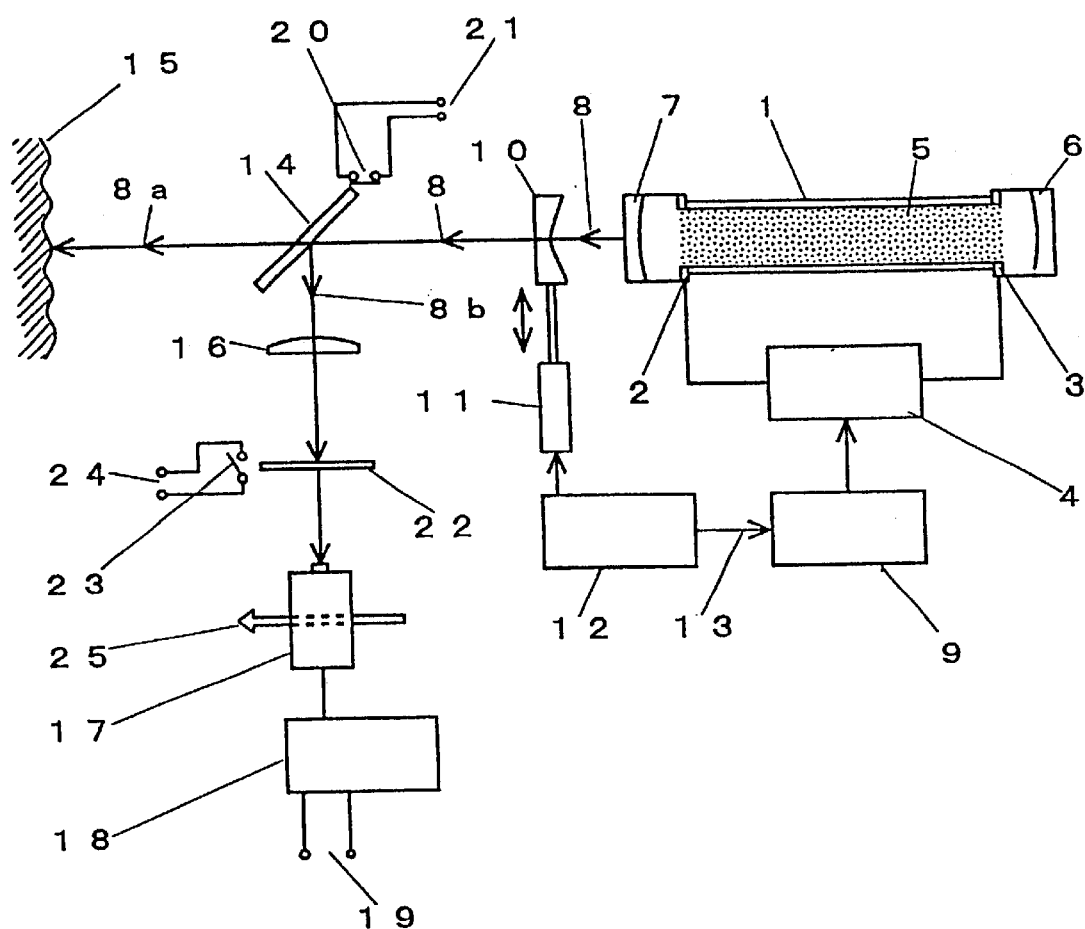
FIG. 1 is a structural diagram showing an entire gas laser oscillator of the invention.
Figure 2:
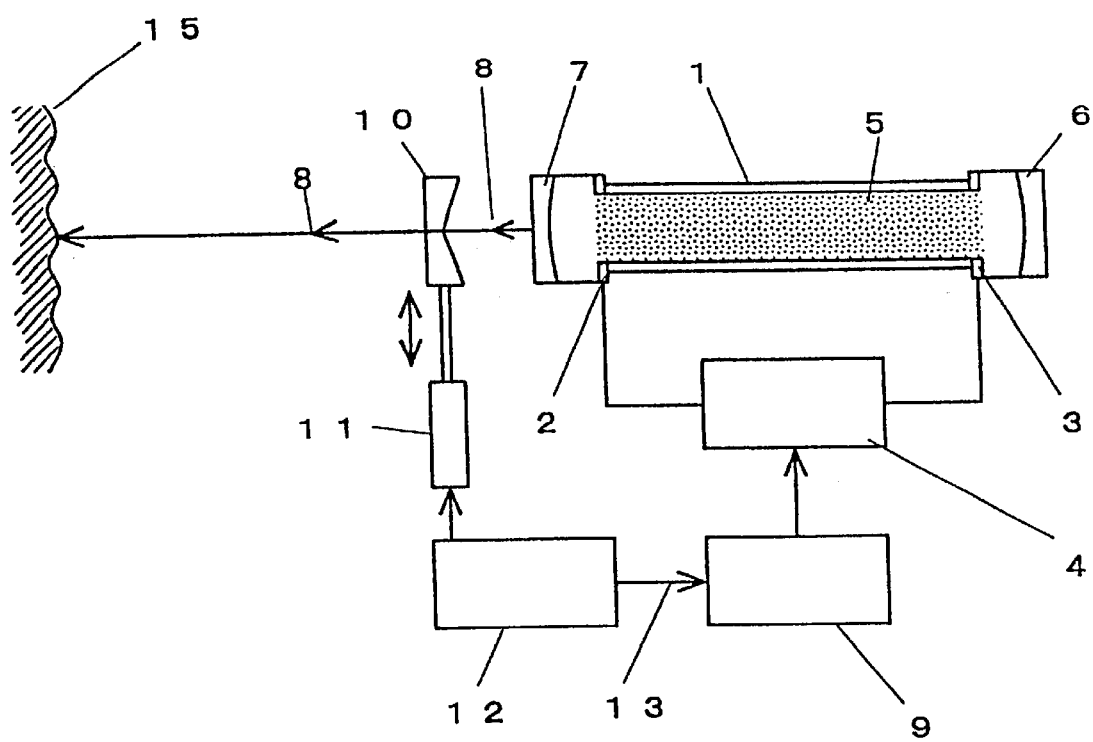
FIG. 2 is a structural diagram showing embodiment 1 of gas laser oscillator of the invention.
Figure 8:
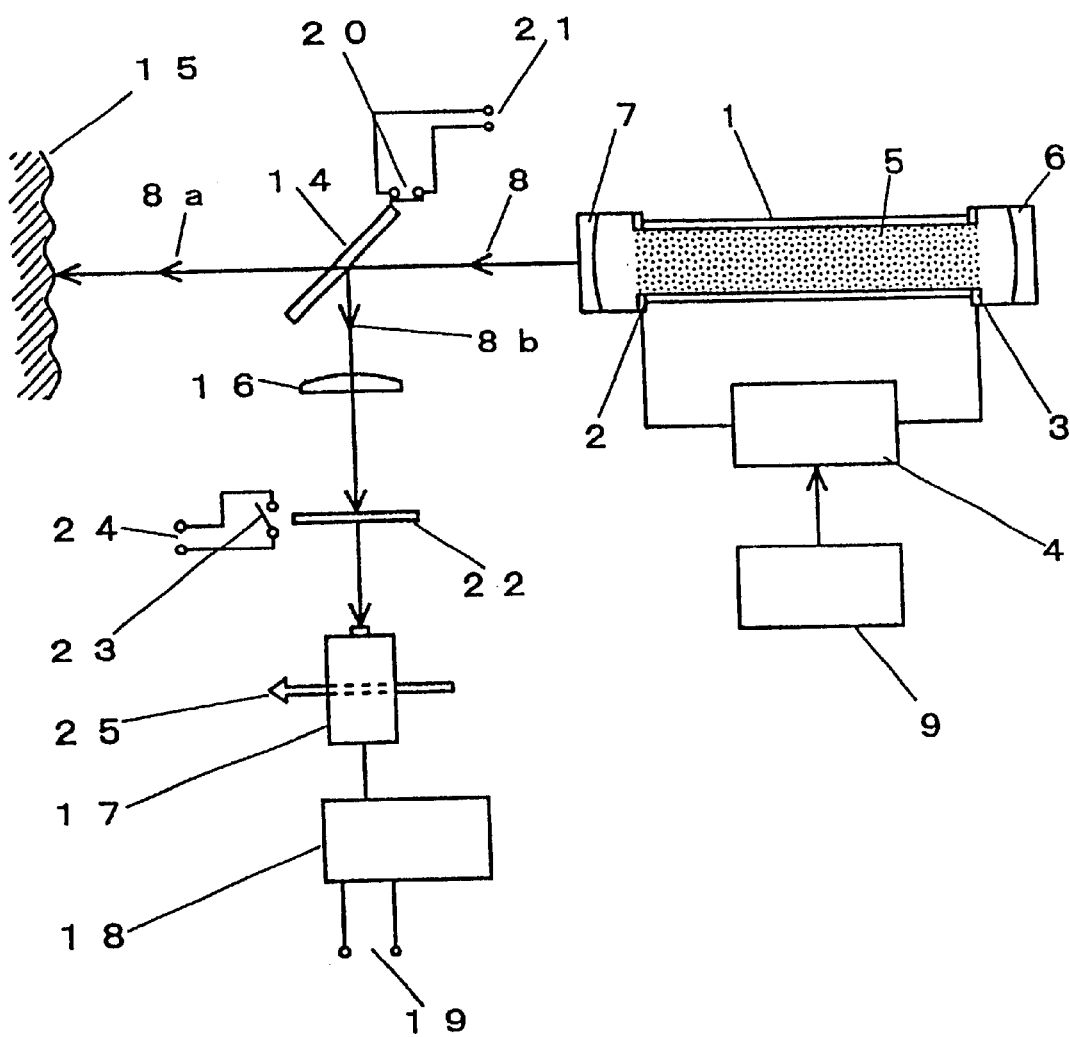
FIG. 8 is a structural diagram showing embodiment 2 of gas laser oscillator of the invention.

FIG. 2 shows a constitution of a portion relating to embodiment 1 of the invention, and FIG. 8 shows a constitution of embodiment 2 of the invention. FIG. 1 shows an entire constitution of the invention combining the portion relating to embodiment 1 in FIG. 2 and the portion relating to embodiment 2 in FIG. 8.

EMBODIMENT 1

Figure 11:
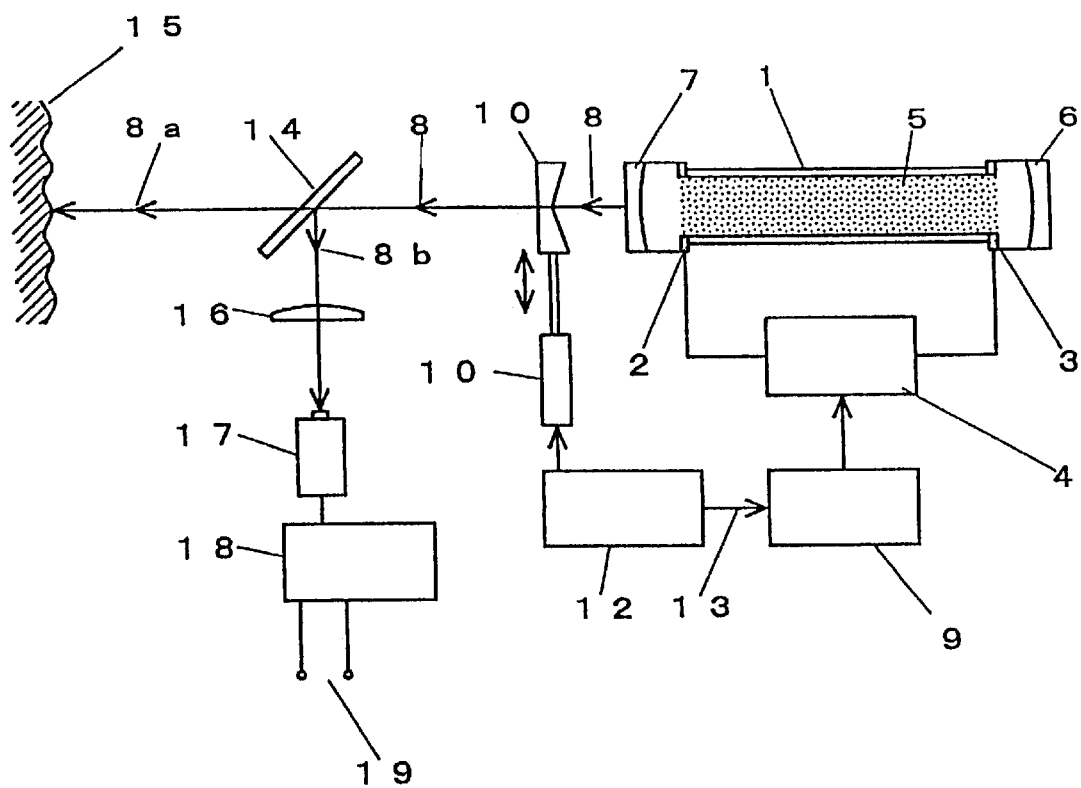
FIG. 11 is a structural diagram showing an entire conventional gas laser oscillator.

Referring now to FIG. 2, embodiment 1 of the gas laser oscillator of the invention is described below. Reference numerals used in FIG. 2 are same as in FIG. 11 relating to the prior art. Although partly duplicating with the description in FIG. 11, FIG. 2 is newly explained.

In FIG. 2, reference numeral 1 is a discharge tube 1 for forming a discharge space 5 inside, and the inside of the discharge tube 1 is filled with laser gas, or laser gas is circulating by a circulating device not shown in the drawing. Reference numeral 2 is an electrode provided at one end of the discharge tube, 3 is an electrode provided at other end of the discharge tube, 4 is a direct-current high voltage power source for applying a voltage for discharging between the electrodes 2 and 3, and 6 is a fully reflective mirror, which is combined with a partially reflective mirror 7 to compose an optical resonator for amplifying the light. Reference numeral 9 is an output control device for controlling the direct-current high voltage power source 4.

In thus constituted gas laser oscillator, the operation is described below. First, according to the command from the output control device 9, a high voltage direct-current voltage in pulse form is applied between the electrodes 2 and 3 from the direct-current high voltage power source 4 for discharging between the electrodes 2 and 3. By this discharge energy, the laser gas in the discharge space 5 is excited. The excited laser gas is set in resonant state by the optical resonator composed of the fully reflective mirror 6 and partially reflective mirror 7, and the laser light is amplified, and a laser beam 8 is issued from the partially reflective mirror 7. The produced laser beam 8 is used in laser processing such as cutting and piercing.

In such gas laser oscillator, also on standby while not processing, discharge occurs in the discharge tube 1, and the laser beam 8 is issued from the partially reflective mirror 7 at a preset output level. However, since an absorber 10 is disposed ahead of the partially reflective mirror 7, the produced laser beam 8 is intercepted by the absorber 10 and does not leak outside.

Figure 3:
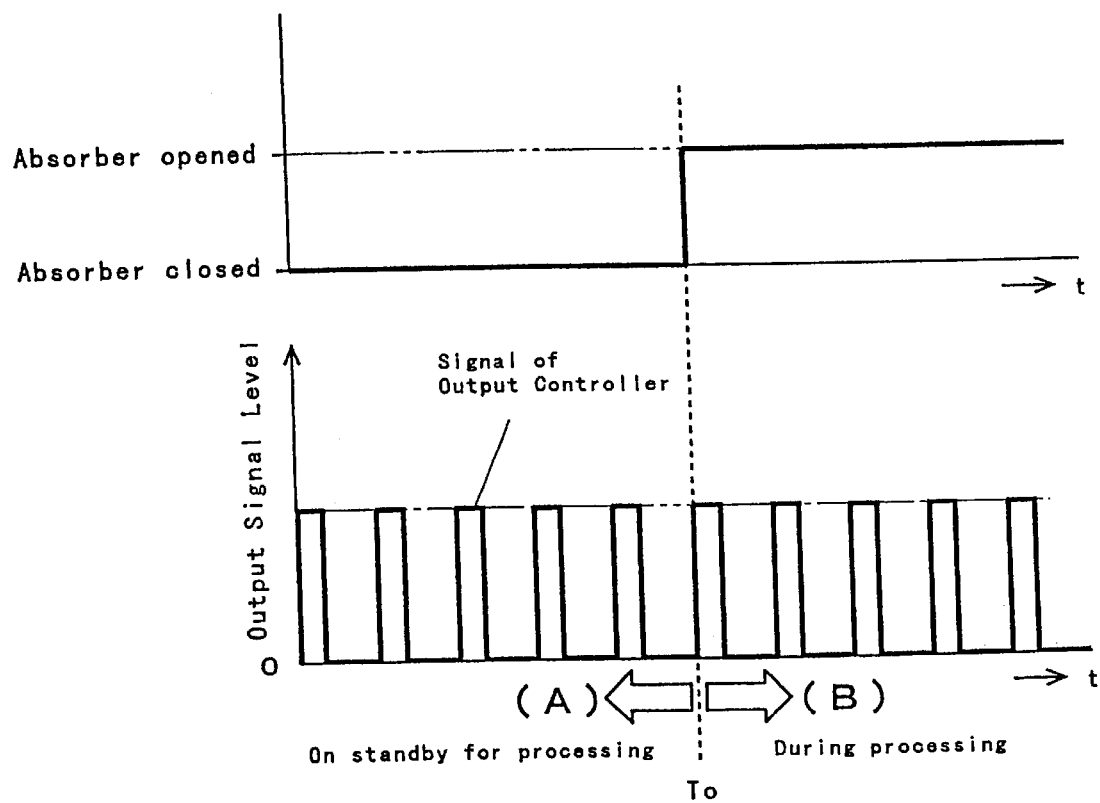
FIG. 3 is a characteristic diagram showing the state of command signal before and after start of processing in embodiment 1 of the invention.

FIG. 3 shows the relation of opening and closing of the absorber 10 and the state of signal issued from the output control device 9 in the process from standby to processing. First, on standby, the absorber 10 is closed, and the laser beam 8 is intercepted of its passage by the absorber 10, and is not produced outside. At this time, from the output control device 9, a signal for commanding same level, same pulse width and same pulse frequency as during processing is sent to the output control device 9. At processing start point $T_0$, the absorber 10 is opened, and the laser beam 8 is issued to outside, and reaches the workpiece 15 to process it.

Figure 4:
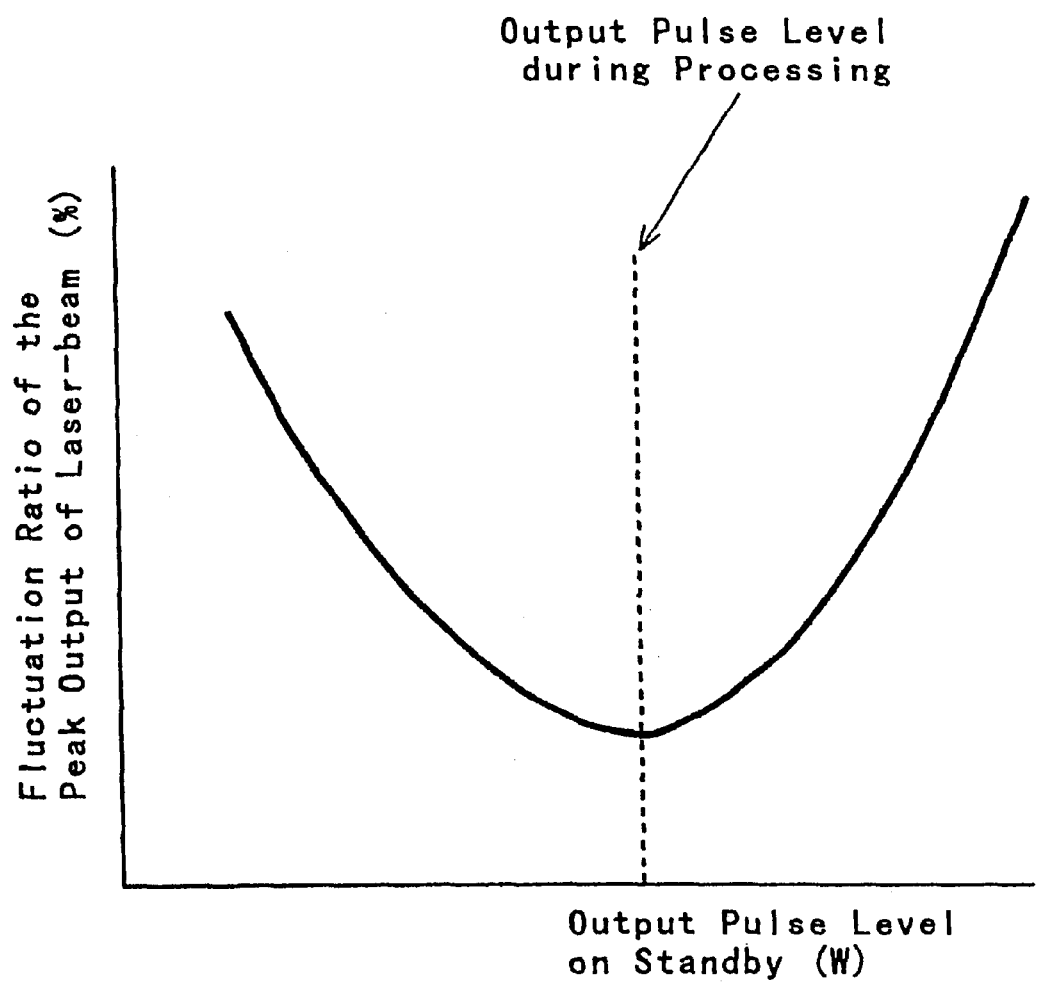
FIG. 4 is a characteristic diagram showing the relation of output level on standby and fluctuation ratio of laser peak output during processing in embodiment 1 of the invention.

Stability of output of the gas laser oscillator thus controlled is described below. FIG. 4 shows changes of fluctuation ratio of output peak value of laser beam by changing only the output level of pulse, while keeping constant the pulse width and pulse frequency of the high voltage direct-current voltage applied between the electrode 2 and electrode 3. The axis of abscissas denotes the output level of pulse, and the axis of ordinates represents the fluctuation ratio of the output peak value of laser beam. The value indicated by broken line on the axis of abscissas shows the value of pulse output level used in processing. As clear from this graph, when the output level on standby is same as the output level during processing, the fluctuation ratio of output peak value of laser beam is minimum. The larger the difference between the output level upon standby and the output level during processing, the greater is the fluctuation ratio of the output peak value of laser beam. Therefore, it is known most preferable that the output level on standby should be set same as the output level during processing.

Figure 5:
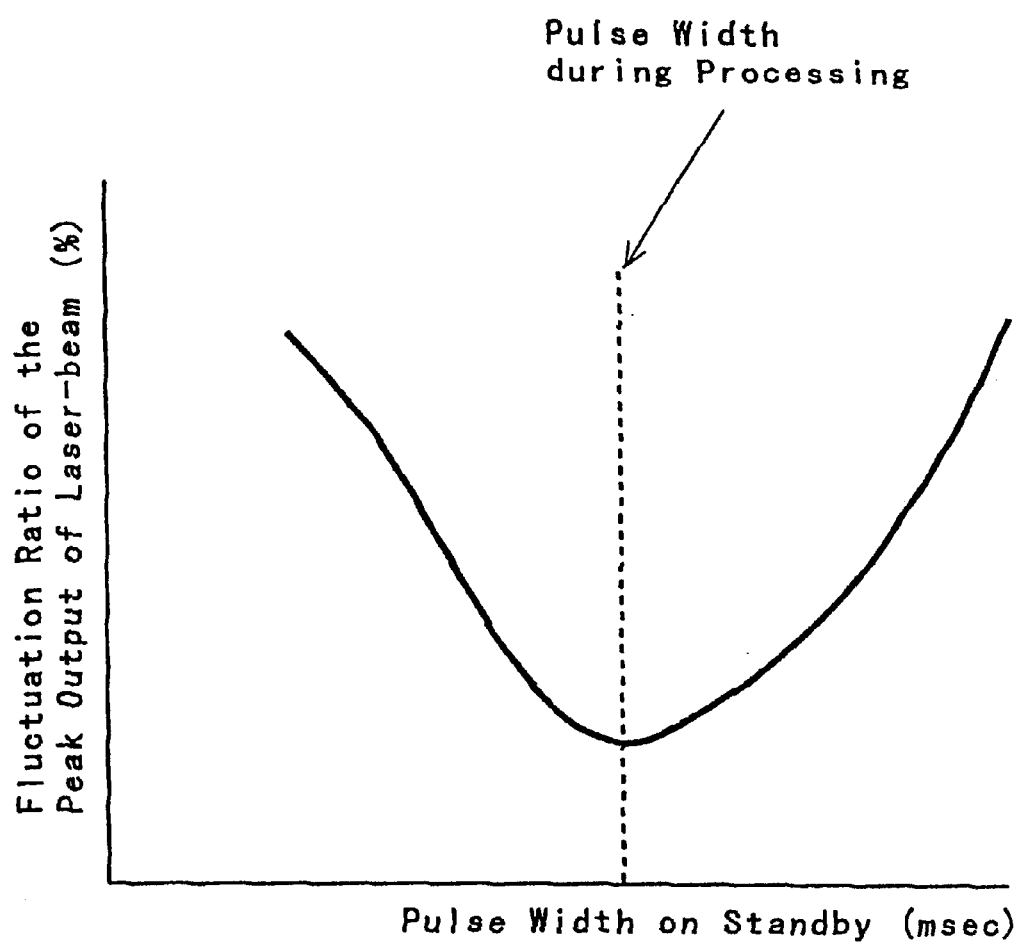
FIG. 5 is a characteristic diagram showing the relation of pulse width on standby and fluctuation ratio of laser peak output during processing in embodiment 1 of the invention.

FIG. 5 shows changes of fluctuation ratio of output peak value of laser beam by changing only the pulse width, while keeping constant the output level and pulse frequency of the high voltage direct-current voltage applied between the electrode 2 and electrode 3. The axis of abscissas denotes the pulse width, and the axis of ordinates represents the fluctuation ratio of the output peak value of laser beam. The value indicated by broken line on the axis of abscissas shows the value of pulse width used in processing. As clear from this graph, when the pulse width on standby is same as the pulse width during processing, the fluctuation ratio of output peak value of laser beam is minimum. The larger the difference between the pulse width upon standby and the pulse width during processing, the greater is the fluctuation ratio of the output peak value of laser beam. Therefore, it is known most preferable that the pulse width on standby should be set same as the pulse width during processing.

Figure 6:
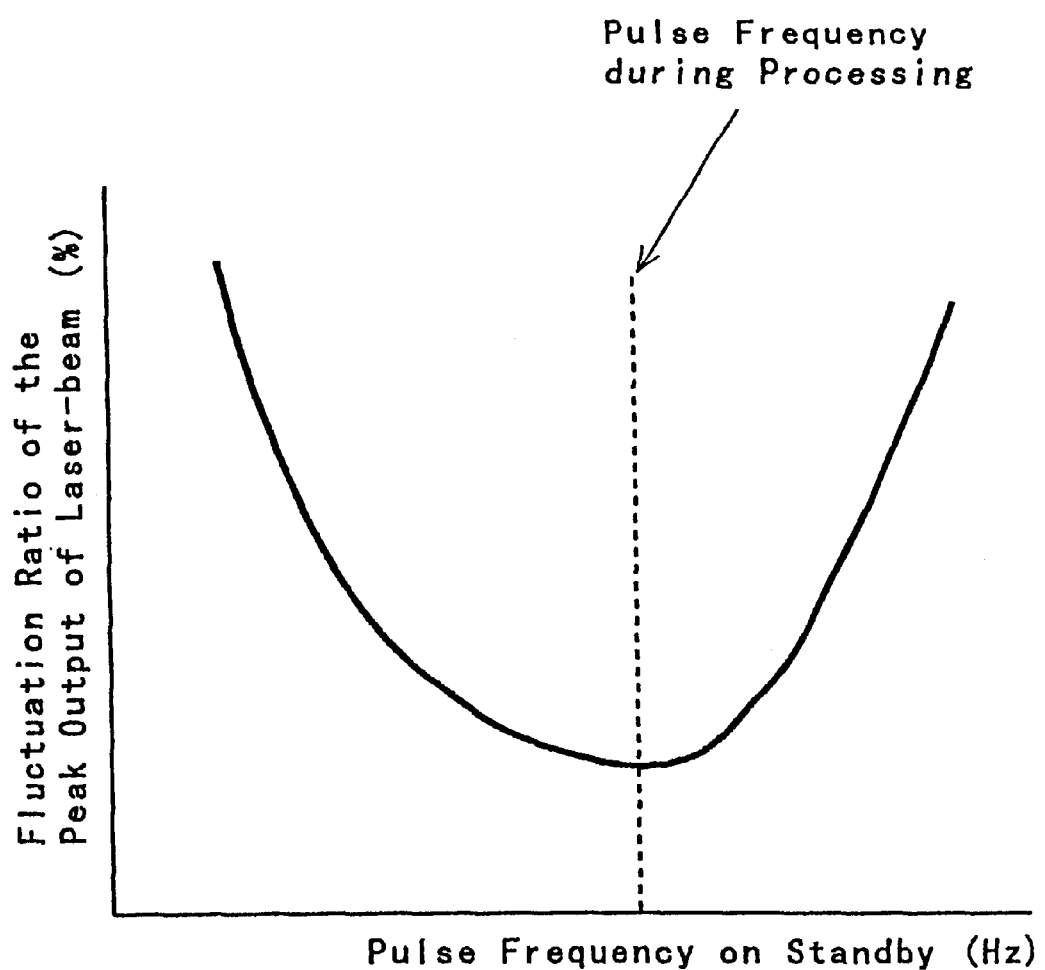
FIG. 6 is a characteristic diagram showing the relation of pulse frequency on standby and fluctuation ratio of laser peak output during processing in embodiment 1 of the invention.
Figure 7:
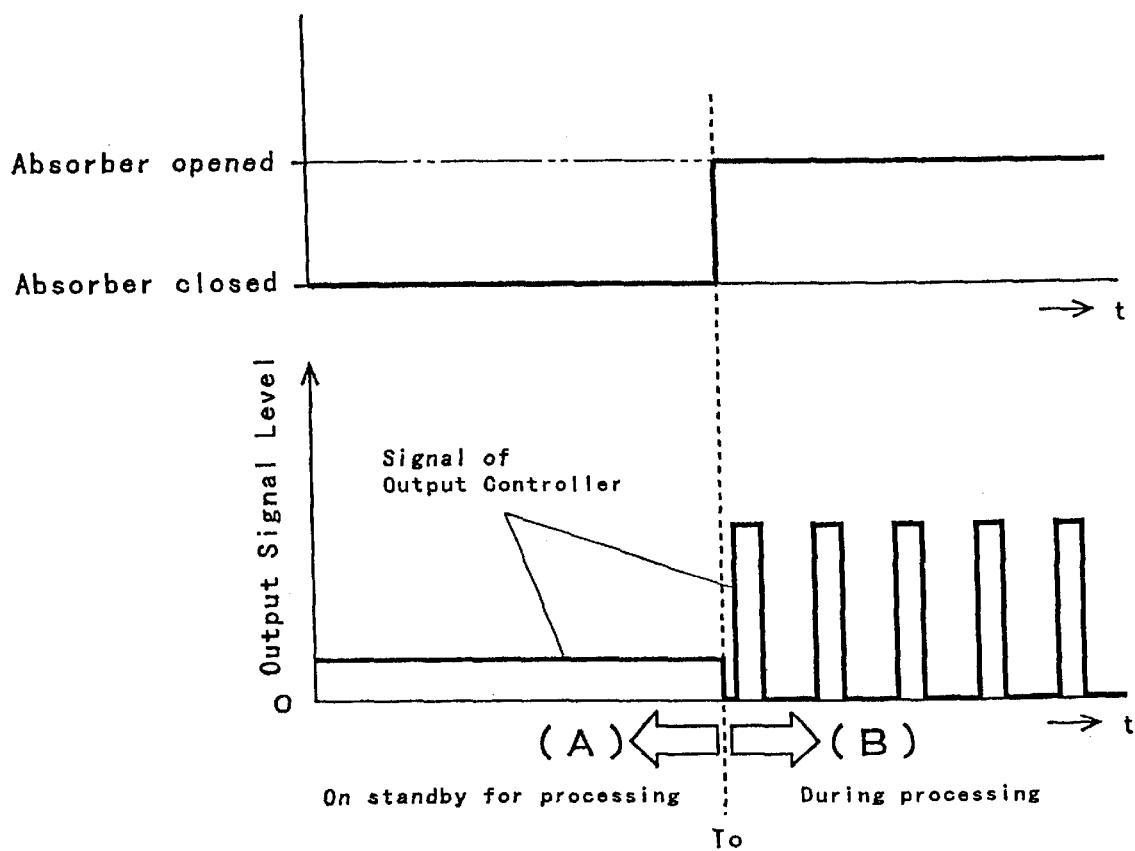
FIG. 7 is a characteristic diagram showing the state of command signal before and after start of processing in a conventional gas laser oscillator.

FIG. 6 shows changes of fluctuation ratio of output peak value of laser beam by changing only the pulse frequency, while keeping constant the output level and pulse width of the high voltage direct-current voltage applied between the electrode 2 and electrode 3. The axis of abscissas denotes the pulse frequency, and the axis of ordinates represents the fluctuation ratio of the output peak value of laser beam. The value indicated by broken line on the axis of abscissas shows the value of pulse frequency used in processing. As clear from this graph, when the pulse frequency on standby is same as the pulse frequency during processing, the fluctuation ratio of output peak value of laser beam is minimum. The larger the difference between the pulse frequency upon standby and the pulse frequency during processing, the greater is the fluctuation ratio of the output peak value of laser beam. Therefore, it is known most preferable that the pulse frequency on standby should be set same as the pulse frequency during processing.

In embodiment 1 of the gas laser oscillator of the invention, on, standby while not processing by laser beam, it is controlled to generate laser beam by applying a direct-current high voltage of same output level, pulse width and pulse frequency as during processing between the electrodes. Therefore, as explained above, a stable laser beam small in fluctuation of output peak value is obtained, and laser processing of high quality is enabled.

EMBODIMENT 2

Referring now to FIG. 8, embodiment 2 of the gas laser oscillator of the invention is described below. Reference numerals used in FIG. 8 are same as in, FIG. 11 relating to the prior art. Although partly duplicating with the description in FIG. 11, embodiment 2 is described below.

In FIG. 8, reference numerals 1 to 9 are same as in the function and operation in embodiment 1 and their explanation is omitted. FIG. 8, reference numeral 14 is a beam splitter disposed on the optical axis of the laser beam. The laser beam 8 is separated by this beam splitter 14, and the straightforward portion 8a reaches the workpiece 15 to be used in processing. The portion 8b reflected and separated by the beam splitter 14 is focused by a focusing lens 16, and irradiates a detector 17. The detector 17 irradiated by the separated portion 8b detects that the laser beam 8 is being emitted. The signal detected by the detector 17 is amplified by an amplifier 18, and is issued from a terminal 19.

Reference numeral 20 is a switch to be actuated when the beam splitter 14 is installed at a specified position, and sends an actuated signal to a terminal 21 when the beam splitter 14 is installed at a specified position The signal of this terminal 21 is sent into the output control device 9. The output control device 9 controls so that the laser beam 8 may be emitted only while the switch 20 is being actuated, that is, while the beam splitter 14 is installed at a specified position.

By thus controlling, the laser beam 8 is not emitted while the beam splitter 14 is being removed. It hence prevents the laser beam 8 having an excessive laser energy not attenuated by the beam splitter 14 from being applied directly to the workpiece 15. It hence avoids processing failure due to application of excessive energy.

In FIG. 8, reference numeral 22 is a shielding plate disposed on the optical axis of the laser beam 8 reflected and separated by the beam splitter 14, and only when the shielding plate 22 is opened, the lager beam 8b reaches the detector 17. Reference numeral 23 is a switch which operates while the shielding plate 22 is open, and the actuated signal of the switch 23 is issued to a terminal 24. The signal of this terminal 24 is sent into the output control device 9. The output control device 9 controls the maximum output of the laser beam 8 so that the energy of the laser beam 8b may not exceed the maximum allowable input of the detector 17 while the switch 23 is being actuated, that is, while the shielding plate 22 is open.

Therefore, the detector 17 is not provided with energy larger than the maximum allowable input, and the detector 17 is not damaged by irradiation of excessive energy.

Further, in FIG. 8, reference numeral 25 is a passage for passing medium such as oil. The passage 25 is provided in contact with the detector 17 so that heat exchange between the medium and the detector 17 may be done efficiently. By controlling the temperature of the medium passing through this passage 25, the temperature of the detector 17 is kept constant.

Figure 9:
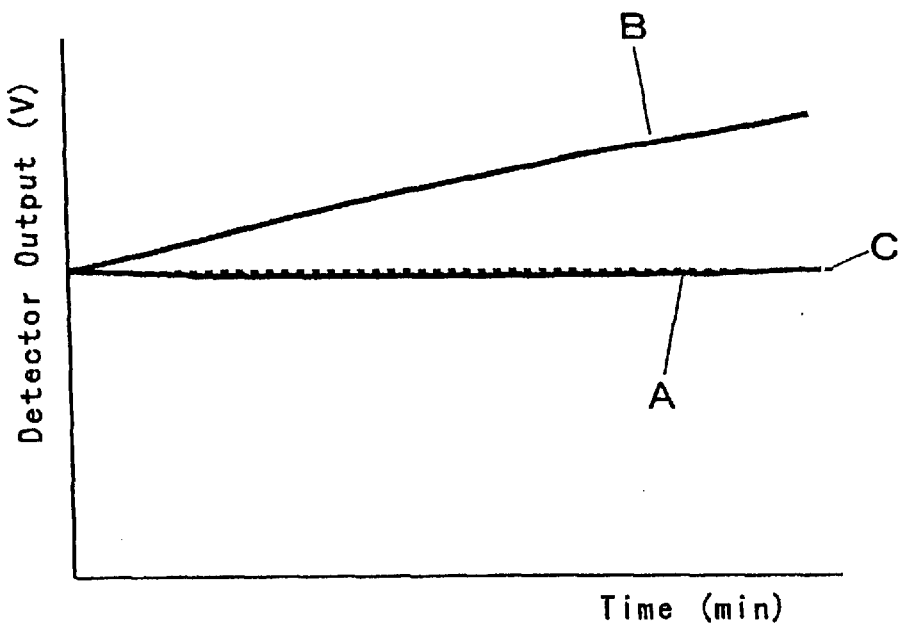
FIG. 9 is a characteristic diagram showing changes of detector output in the gas laser oscillator in embodiment 2 of the invention and in the prior art.

FIG. 9 shows the stability of output of the detector controlled of temperature. In FIG. 9, the axis of abscissas denotes the time (unit: minutes), and the axis of ordinates represents the output level. In the diagram, A shows the temperature-controlled state of the detector 17 by the medium, and B shows the non-controlled state of the detector 17. In the non-controlled state B of the detector 17, as the time passes, the output level of the detector 17 hardly changes, but in the temperature-controlled state A of the detector 17 by medium, the output level of the detector 17 slightly changes. Incidentally, the broken line C shows the state of output level free from fluctuation.

Therefore, by passing temperature-controlled medium into the passage 25 and controlling the temperature of the detector 17, the output level of the detector 17 is stabilized by eliminating the effects of ambient temperature or laser beam irradiation. By stabilizing the output level of the detector 17, it is judged correctly whether the laser beam is emitted or not, so that highly reliable control of the gas laser oscillator is realized.

As shown in FIG. 8, the beam splitter 14, focusing lens 16, shielding plate 24, and detector 17 are disposed in series on the optical axis of the laser beam 8b, but in this embodiment, these components are arranged in the horizontal direction. That is, the components are disposed so that the optical axis of the laser beam 8b may be directed in the horizontal direction. In such arrangement, the reflection surface of the beam splitter. 14, both surfaces of the focusing lens 16, and the detection surface of the detector 17 are parallel to the vertical or nearly vertical plane, and therefore deposit of dust on the passing surface of laser beam 8b of these components may be suppressed. Since deposit of dust is suppressed, the output level of the detector 17 may be smaller in changes in the time course.

Figure 10:
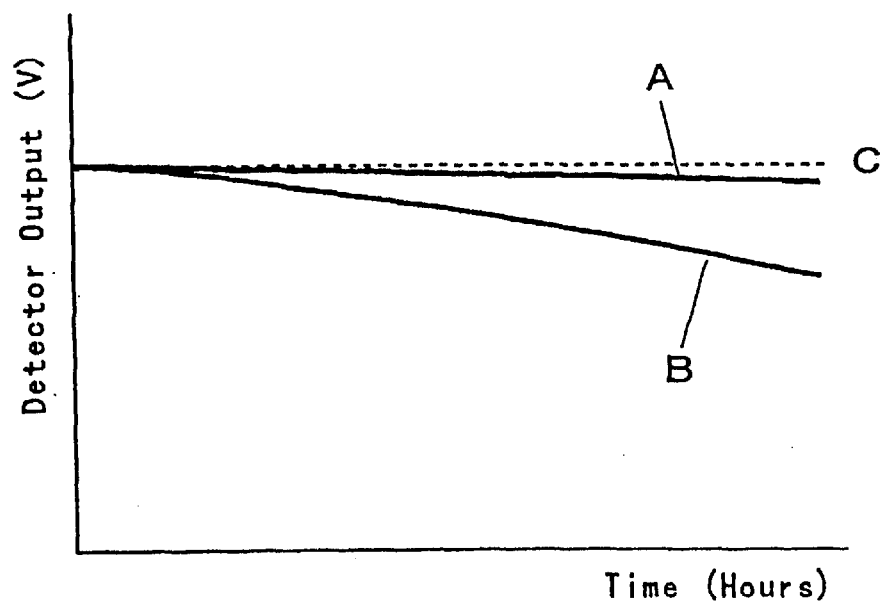
FIG. 10 is a characteristic diagram showing time-course changes of detector output in the gas laser oscillator in embodiment 2 of the invention and in the prior art.

FIG. 10 shows changes of the output level of the detector 17 in the time course. In FIG . 10, the axis of abscissas denotes the time (unit: hours), and the axis of ordinates represents the output level of the detector. In the diagram, B shows a case in which the optical axis of the laser beam 8b is directed in the vertical direction, and A shows a case in which the optical axis of the laser beam 8b is directed in the horizontal direction. As clear from FIG. 10, when the beam splitter 14, focusing lens 16, shielding plate 22 and detector 17 are arranged in the horizontal direction, changes of output level of the detector 17 in the time course are extremely smaller as compared with the case of arrangement in the vertical direction. Incidentally, the broken line C in the diagram indicates the state free from fluctuations in the output level.

Therefore, when the beam splitter 14, focusing lens 16, shielding plate 22 and detector 17 are arranged in the horizontal direction, the output level of the detector 17 can be stabilized for a long period, so that the gas laser oscillator can be controlled at high reliability without malfunction.

What is claimed is:

1. A gas laser oscillator comprising:
   a discharge tube for forming a discharge space inside,
   a fully reflective mirror disposed toward the opening at one end of said discharge space for composing an end mirror,
   a partially reflective mirror disposed toward the opening at other end of said discharge space for composing an output mirror, a pair of electrodes disposed at both ends of said discharge tube, a direct-current high voltage power source for discharging in said discharge space by applying a high voltage of pulse form between said pair of electrodes, an output control device for controlling the output of said direct-current high voltage power source, a beam splitter disposed outside of said partially reflective mirror so as to cut across the passage of laser beam for separating the laser beam, a switch to be actuated when said beam splitter is installed at a specified position, a focusing lens for focusing the laser beam separated by reflection by said beam splitter, a detector for detecting the laser beam focused by said focusing lens, an amplifier for amplifying the output of said detector and issuing a detection signal, a shielding plate disposed between the focusing lens and detector for opening and closing, and a switch to be actuated when the shielding plate is opened.

2. A gas laser oscillator of claim 1, wherein said output control device controls said direct-current high voltage power source so that the laser beam may be emitted only while the switch to be actuated when said beam splitter is installed at a specified position is being actuated.

3. A gas laser oscillator of claim 1, wherein said output control device controls said direct-current high voltage power source so as not to emit a laser beam exceeding the maximum allowable input of said detector while the switch to be actuated when said shielding plate is opened is being actuated.

4. A gas laser oscillator of claim 1, wherein passage of medium controlled of temperature is provided so as to exchange heat with said detector, and said detector is controlled of temperature by the medium controlled of temperature.

5. A gas laser oscillator of claim 1, wherein said beam splitter, said focusing lens, and said detector are disposed so that the axis of laser beam passing therethrough may be in the horizontal direction.

* * * * *